(12) United States Patent
Zhang et al.

(10) Patent No.: US 8,771,027 B2
(45) Date of Patent: Jul. 8, 2014

(54) ELASTIC CLAMP, CONTACT RAIL ASSEMBLY, AND PV ASSEMBLY JUNCTION BOX HAVING THE ASSEMBLY

(71) Applicant: Tyco Electronics (Shanghai) Co., Ltd., Shanghai (CN)

(72) Inventors: Zhenhua Zhang, Shanghai (CN); Qingtai Ma, Shanghai (CN); Xiaoqun Chen, Shanghai (CN)

(73) Assignee: Tyco Electronics (Shanghai) Co. Ltd., Shanghai (CN)

( * ) Notice: Subject to any disclaimer, the term of this patent is extended or adjusted under 35 U.S.C. 154(b) by 5 days.

(21) Appl. No.: 13/724,421

(22) Filed: Dec. 21, 2012

(65) Prior Publication Data

US 2013/0189861 A1    Jul. 25, 2013

(30) Foreign Application Priority Data

Dec. 22, 2011  (CN) ...................... 2011 2 0547037 U

(51) Int. Cl.
    *H01R 4/48* (2006.01)
(52) U.S. Cl.
    USPC .......................................................... 439/835
(58) Field of Classification Search
    CPC ....................................................... H01R 4/20
    USPC ................... 439/880, 433, 441, 111, 835
    See application file for complete search history.

(56) References Cited

U.S. PATENT DOCUMENTS

| 5,993,270 | A * | 11/1999 | Geske et al. ................. 439/835 |
| 6,336,824 | B1 * | 1/2002 | Sorig ............................ 439/441 |
| 6,796,855 | B2 * | 9/2004 | Fricke et al. .................. 439/835 |
| 6,851,967 | B2 * | 2/2005 | Miyoshi et al. ............... 439/441 |
| 7,287,999 | B2 * | 10/2007 | Holterhoff et al. ........... 439/441 |
| 8,040,678 | B2 | 10/2011 | Tai et al. |
| 8,152,536 | B2 * | 4/2012 | Scherer et al. ............... 439/76.1 |
| 8,388,358 | B2 * | 3/2013 | Thompson et al. .......... 439/76.1 |
| 2004/0248457 | A1 * | 12/2004 | Walter .......................... 439/441 |
| 2011/0220187 | A1 * | 9/2011 | Wang et al. .................... 136/252 |
| 2011/0318975 | A1 * | 12/2011 | Giefers et al. ................ 439/818 |

FOREIGN PATENT DOCUMENTS

| CN | 101958481 A | 1/2011 |
| CN | 201805009 U | 4/2011 |

OTHER PUBLICATIONS

Pliers for Foil Clip (Omega-Spring) PN 1740873, May 9, 2007.
PPT, SolarK 1-Rail Junction Box, Nov. 2011, Henry Ko, 29 pages.

* cited by examiner

*Primary Examiner* — Neil Abrams
*Assistant Examiner* — Phuongchi T Nguyen
(74) *Attorney, Agent, or Firm* — Barley Snyder

(57) ABSTRACT

A clamp for electrically connecting a contact rail and a bus bar of a PV assembly includes a base having a first end and a second end positioned opposite the first end. Two fixing portions extend from both sides of the base and away from and perpendicular to the first surface, and adapted to detachably fix the clamp to the contact rail. An extending portion has a first bending extension extending and bent from the base, a parallel extension connected with the first bending extension and extending in parallel with and apart from the first surface, a second bending extension connected with the parallel extension and extending between the two fixing portions, and an actuating extension connected with the second bending extension and extending beyond the base. A locating protrusion is formed integrally with the base and adapted to engage within the first locating element and the second locating element.

16 Claims, 3 Drawing Sheets

US 8,771,027 B2

ELASTIC CLAMP, CONTACT RAIL ASSEMBLY, AND PV ASSEMBLY JUNCTION BOX HAVING THE ASSEMBLY

CROSS-REFERENCE OF RELATED APPLICATION

This application claims the benefit of the filing date under 35 U.S.C. §119(a) of Chinese Patent Application No. 201120547037.8, filed Dec. 22, 2011.

FIELD OF THE INVENTION

The invention relates to a photovoltaic (PV) assembly, junction box, and especially to a clamp used with a contact tip of a contact rail in the junction box to electrically connect the contact tip with a bus bar of a solar cell panel, a contact rail assembly having the clamp and a PV assembly junction box having the contact rail assembly.

BACKGROUND

In a conventional PV assembly, it is necessary to electrically connect a bus bar of a solar cell panel with a contact tip of a contact rail in a PV assembly junction box (hereinafter, referred to as junction box). Usually, the electrical connection is made by using a special elastic clamp. For example, as shown in FIG. 1, an Ω-shaped clamp 80 may be used, and in the case that the contact tip 91 of the contact rail 90 is inserted between two gripping portions 81 of the clamp, or in the case that the two gripping portions of the clamp have gripped the contact tip, the tip of the bus bar is inserted between the two gripping portions to electrically connect with the contact tip.

However, the above elastic clamp cannot provide a sufficient gripping force so that it is difficult to ensure a stable electrical connection between the bus bar and the contact tip of the contact rail.

In addition, opening of the elastic clamp usually requires a special tool, which makes the operation of electrically connecting the bus bar and the contact rail complicated and inconvenient.

Therefore, it is necessary to improve the conventional elastic clamp.

SUMMARY

The invention has been made to overcome or alleviate at least one aspect of the above mentioned disadvantages. Accordingly, it would be advantageous to provide a clamp which has improved clamping force for ensuring stable electrical connection and which makes the electrical connection operation between the bus bar and the contact rail convenient.

According to one aspect of the invention, a clamp for electrically connecting a contact rail and a bus bar of a PV assembly, wherein the clamp includes a base having a first surface and a second surface opposite to the first surface, and having a first end and a second end opposite to the first end. Two fixing portions extend from both sides of the base and away from and substantially perpendicular to the first surface. The fixing portions are adapted to detachably fix the clamp to the contact rail. An extending portion has a first bending extension extending and bent from the first end of the base, a parallel extension connected with the first bending extension and extending substantially in parallel with and spaced apart from the first surface, a second bending extension connected with the parallel extension and bent to extend between the two fixing portions towards the base; and an actuating extension connected with the second bending extension and extending beyond the base. The actuating extension is provided with a first locating element and a second locating element. A locating protrusion is formed integrally at the second end of the base and adapted to be engaged within the first locating element and the second locating element. When the locating protrusion is engaged with the first locating element, the clamp is in a released state, and when the locating protrusion is engaged with the second locating element, the clamp is in a locked state. When a tip of the actuating extension is pressed in a direction from the first end to the second end, the locating protrusion may be adapted to be moved from the first locating element to the second locating element after being disengaged from the first locating element. Further, the first locating element and the second locating element may be a first locating hole and a second locating hole respectively, and when the tip of the actuating extension is pressed in the direction from the first end to the second end, the locating protrusion is adapted to be moved from the first locating hole, after being disengaged from the first locating element, to the second locating hole to be stuck in the second locating hole.

BRIEF DESCRIPTION OF THE DRAWING

The invention will now be described in further detail with reference to embodiments shown in the following figures of which.

DETAILED DESCRIPTION OF THE EMBODIMENT(S)

Figure 1:
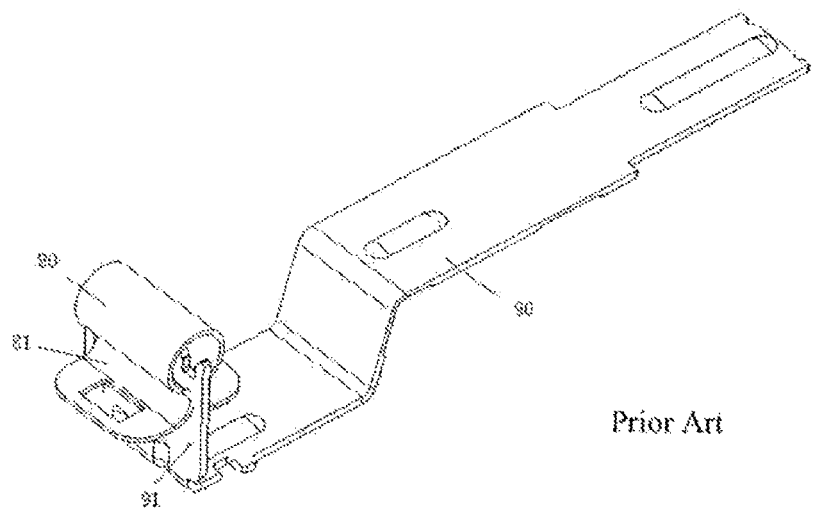
FIG. 1 is a perspective view showing a conventional elastic clamp mated with a contact rail.

Embodiments of the invention will be described hereinafter in detail with reference to the attached drawings, wherein the like reference numerals refer to the like elements throughout the specification. These embodiments should not be construed as being limited to the embodiment set forth herein, but are rather for illustrative purposes only to show possible embodiments, among others, of the invention.

Figure 2:
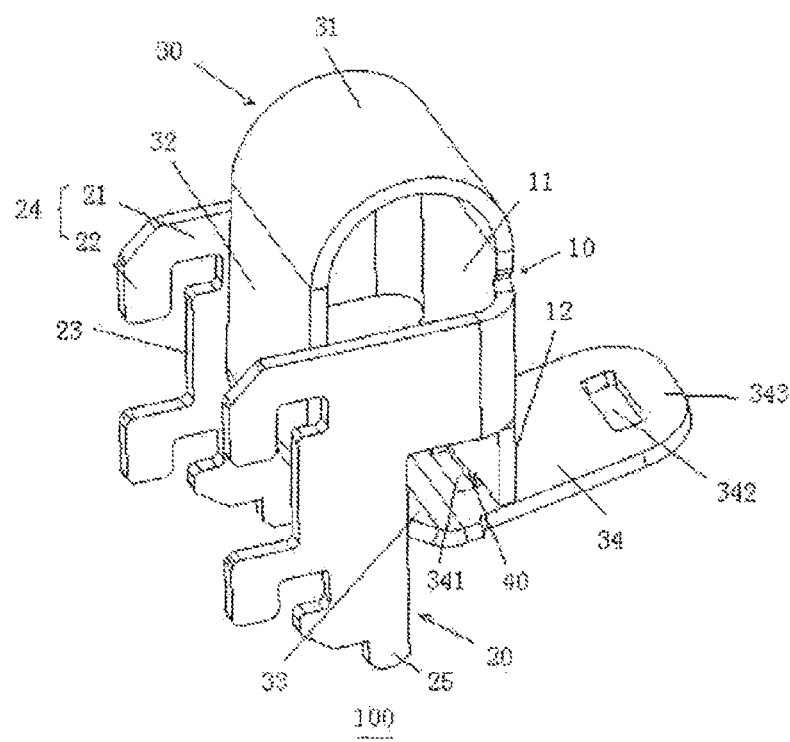
FIG. 2 is a perspective view of a clamp according to one exemplary embodiment of the invention.
Figure 3:
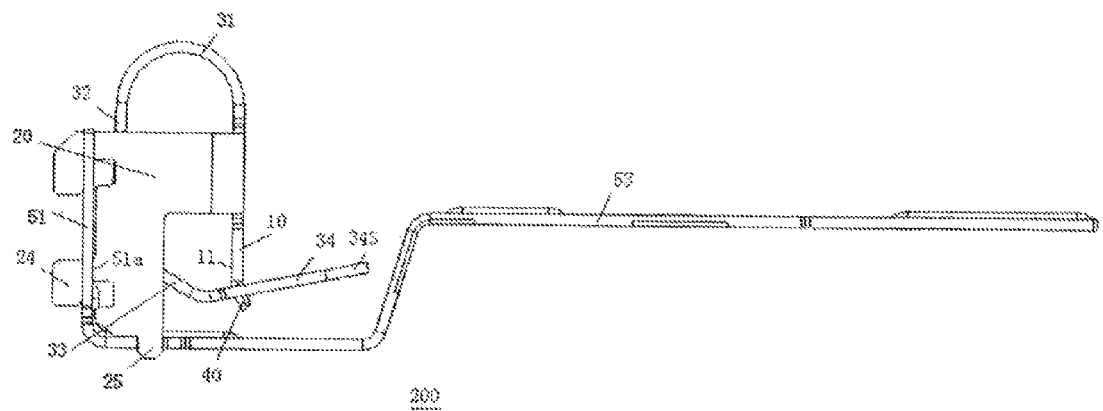
FIG. 3 is a side view of a contact rail assembly according to one exemplary embodiment of the invention.

A clamp 100 according to one exemplary embodiment of the present invention will be described with reference to FIG. 2. The clamp 100 is used for electrically connecting a contact rail and a bus bar of a PV assembly. As shown in FIG. 2, the clamp 100 comprises a base 10 having a first surface 11 and a second surface 12 opposite to the first surface 11, and having a first end and a second end opposite to the first end. Two fixing portions 20 extend from both sides of the base 10 and away from and substantially perpendicular to the first surface 11. The fixing portions 20 are adapted to detachably fix the clamp 100 to the contact rail 50. An extending portion 30 has a first bending extension 31 extending and bent from the first end of the base 10, a parallel extension 32 connected with the first bending extension 31 and extending substantially in parallel with and spaced apart from the first surface 11, a second bending extension 33 connected with the parallel extension 32 and bent to extend between the two fixing portions 20 towards the base 10, and an actuating extension 34 connected with the second bending extension 33 and extending beyond the base 10. The actuating extension 34 is provided with a first locating element 341 and a second locating element 342. A locating protrusion 40 is formed integrally at the second end of the base 10 and adapted to be engaged within the first locating element 341 and the second locating element 342. When the locating protrusion 40 is engaged with the first locating element 341, the clamp 100 is in a released state, and when the locating protrusion 40 is engaged with the second locating element 342, the clamp 100 is in a locked state.

Referring to FIG. 2, when the locating protrusion 40 is engaged with the first locating element 341, an acute angle is formed between the second surface 12 and a portion of the actuating extension 34 extends beyond the base 10. Thus, when a tip 343 of the portion of the actuating extension 34 extending beyond the base 10 is urged downward, such an acute angle provides sufficient downward movement space and allowing the locating protrusion 40 to be engaged with the second locating element 342.

Advantageously, when the tip 343 of the actuating extension 34 is urged in a direction from the first end to the second end (that is, downwards in FIG. 2), the locating protrusion 40 is adapted to be moved from the first locating element 341 to the second locating element 342 after being disengaged from the first locating element 341.

As shown in FIG. 2, the first locating element 341 and the second locating element 342 are a first locating hole and a second locating hole respectively, and when the tip 343 of the actuating extension 34 is urged in the direction from the first end to the second end, the locating protrusion 40 is adapted to be moved from the first locating hole to the second locating hole, after being disengaged from the first locating hole, to be engaged in the second locating hole. It should be noted that the locating element may be in other forms, for example, a stop provided on the actuating extension 34, in this case, the locating protrusion 40 may have a larger size and itself may even be a portion of the base 10.

In FIG. 2, the shapes of the first bending extension 31 and the second bending extension 33 are just for illustration, and may be modified if necessary.

Though not shown, edges of each fixing portion 20 remote from the first surface 11 may be bent to form guiding recesses, the guiding recesses extending in a direction substantially in parallel with the first surface 11.

Referring to FIG. 2, a plurality of hooks 24 protrude from edges 23 of each fixing portion 20 away from the first surface 11. Specifically, each hook 24 comprises a first section 21 extending substantially perpendicular to and away from the first surface 11, and a second section 22 connected with the first section 21 and extending in a direction from the first end to the second end. Each second section 22 is spaced apart from the corresponding edge 23 of the fixing portion 20 by a distance. Those skilled in the art may know that the hook 24 may be in other suitable shapes. As shown in FIG. 2, each fixing portion 20 includes a locating tab 25 at a lower end thereof.

A contact rail assembly 200 according to one exemplary embodiment of the present invention will be described next with reference to FIGS. 2-6. The contact rail assembly 200 for a PV assembly has a clamp 100 and a contact rail 50 having a contact tip 51 and a body 53. The contact tip 51 extends from and substantially perpendicular to the body 53, and the contact tip 51 is adapted to be electrically connected with a bus bar (not shown). The clamp 100 is detachably fixed to the contact tip 51 by means of the fixing portions 20. A contact surface 51a of the contact tip 51 facing the first surface 11 of the clamp 100 is substantially in parallel with the first surface 11. When the locating protrusion 40 is engaged with the first locating element 341, the parallel extension 32 of the extension portion is spaced apart from the contact surface 51a by a distance, and when the locating protrusion 40 is engaged with the second locating element 342, the parallel extension 32 of the extension portion is elastically abutted against the contact surface 51a so that an end of the bus bar is clamped between the contact surface 51a and the parallel extension 32.

Alternatively, edges of each fixing portion 20 remote from the first surface 11 are bent to form guiding recesses, and the guiding recesses extend in a direction substantially in parallel with the first surface 11 and are adapted to be slidably fit to the contact tip 51. In this way, the clamp 100 may be fitted to the contact tip 51 of the contact rail 50 in a sliding inserting manner. As known by those skilled in the art, an interference fit may be formed between the guiding recesses and the side edges of the contact tip.

Figure 5:
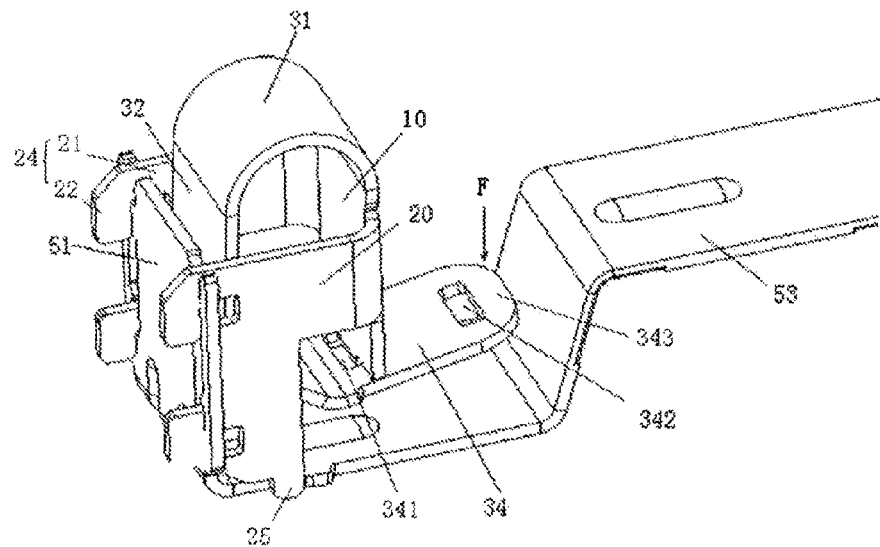
FIG. 5 is a partial perspective view of the contact rail assembly shown in FIG. 3, wherein the clamp is in an opened state.
Figure 6:
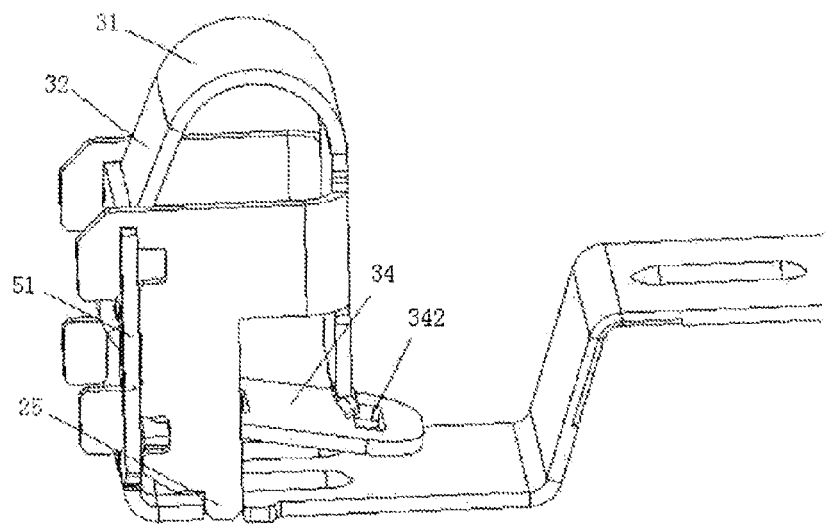
FIG. 6 is another partial perspective view of the contact rail assembly shown in FIG. 3, wherein the clamp is substantially in a locked state.

As shown in FIGS. 5 and 6, a plurality of hooks 24 protrude from edges 23 of each fixing portion 20 remote from the first surface 11. The contact tip 51 of the contact rail 50 is provided with a plurality of bayonets 52, and the plurality of hooks 24 are adapted to be engaged within the plurality of bayonets 52 respectively. Further, each hook 24 comprises a first section 21 extending substantially perpendicular to and away from the first surface 11, and a second section 22 connected with the first section 21 and extending in a direction from the first end to the second end, wherein each second section 22 is spaced apart from the corresponding edge 23 of the fixing portion 20 by a distance substantially equal to the thickness of the contact tip 51. Referring to FIG. 5, the contact tip 51 is inserted between the second section 22 and the edge 23 of a corresponding fixing portion 20.

Figure 4:
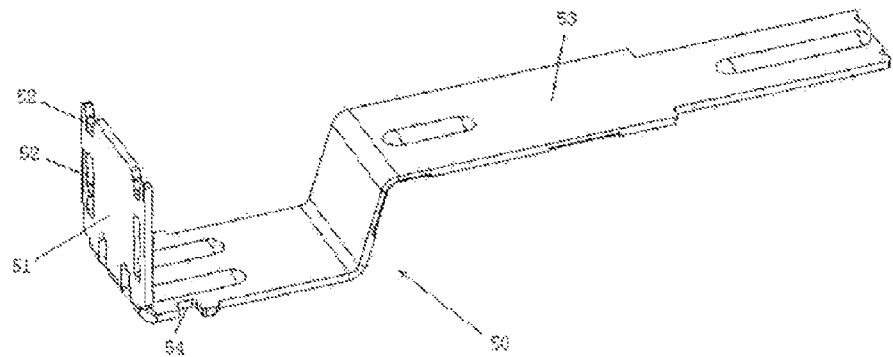
FIG. 4 is a perspective view of the contact rail shown in FIG. 3.

Referring to FIGS. 4-6, each fixing portion 20 includes a locating tab 25 at a lower end thereof. A portion of an end of the contact rail 50 perpendicular to the contact tip 51 is provided at each side thereof with one recess 54, and the locating tab 25 is adapted to be fit in a corresponding recess 54. The movement of the base 10 towards the contact tip 51 may be effectively prevented when the tip 343 of the actuating extension 34 is urged downwards because the locating tab 25 is inserted in the recess 54, which helps to maintain a contact force applied towards the contact tip 51.

As shown in FIG. 5, when the locating protrusion 40 is in the first locating hole, the clamp 100 is in an opened position (or an opened state), and thus the tip 343 of the bus bar may be easily inserted into the clearance between the parallel extension 32 and the contact tip 51, in this case, the tip 343 of the actuating extension 34 is in a tilt-up position. As shown in FIG. 6, when the locating protrusion 40 is in the second locating hole with the help of the applied force F (see FIG. 5) on the tip 343 of the actuating extension 34, the tip 343 of the actuating extension 34 is moved towards the body 53 of the contact rail 50 and is inclined downwards. At the same time, the downward urging of the tip 343 of the actuating extension 34 causes elastic deformation of the whole parallel extension 32 and thus the decreasing of the distance between the parallel extension 32 and the contact tip 51, moving the clamp 100 into the closed position (or the locked position) for holding the bus bar.

In the case that the locating protrusion 40 is engaged with the first locating element 341, the clamp 100 may be fixed to the contact tip 51 by inserting the hooks 24 into the bayonets 52. In order to detach the clamp 100 from the contact tip 51 of the contact rail 50, a force may be applied to the clamp 100 as shown in FIG. 5 while the locating protrusion 40 is still held to be engaged with the first locating element 341, so as to disengage the hooks 24 from the bayonets 52.

The detaching and the fixing of the clamp 100 according to the present invention are therefore simplified and convenient. In addition, the clamp 100 may be replaced if necessary, and the clamping force of the clamp 100 is improved to ensure a stable electrical connection between the bus bar and the contact rail 50.

The invention also relates to a PV assembly junction box, having a housing, at least one bus bar, and at least one of the above described contact rail assemblies 200. In the housing, the bus bar is adapted to be electrically connected with the contact tip 51 of a corresponding contact rail 50 by means of the clamp 100.

Although several exemplary embodiments have been shown and described, it will be appreciated by those skilled in the art that the above exemplary embodiments are only for illustration, and various changes or modifications may be made in these exemplary embodiments by those skilled in the art without departing from the principles and spirit of the disclosure, the scope of which is defined in the appended claims and their equivalents. In addition, the structures described in the various exemplary embodiments may be combined freely if the combined structure is not contrary to the principles of the present invention, thus, more modified junction boxes may be provided for solving the technical problem of the present invention.

What is claimed is:

1. A clamp for electrically connecting a contact rail and a bus bar of a photovoltaic assembly comprising:
   a base having a first surface and a second surface opposite to the first surface, and having a first end and a second end opposite to the first end;
   two fixing portions extending from both sides of the base and away from and substantially perpendicular to the first surface, the fixing portions being adapted to detachably fix the clamp to the contact rail;
   an extending portion having: a first bending extension extending and bent from the first end of the base; a parallel extension connected with the first bending extension and extending substantially in parallel with and spaced apart from the first surface; a second bending extension connected with the parallel extension and bent to extend between the two fixing portions towards the base; and an actuating extension connected with the second bending extension and extending beyond the base, the actuating extension being provided with a first locating element and a second locating element; and
   a locating protrusion formed integrally at the second end of the base, being engageable with the first locating element to define a released state, and being engageable with the second locating element to define a locked state for holding the bus bar.

2. The clamp according to claim 1, wherein in the released state, an acute angle is formed between the second surface and a portion of the actuating extension extending beyond the base.

3. The clamp according to claim 1, wherein edges of each fixing portion remote from the first surface are bent to form guiding recesses, the guiding recesses extending in a direction substantially in parallel with the first surface.

4. The clamp according to claim 1, wherein when a tip of the actuating extension is urged in a direction from the first end to the second end, the locating protrusion travels from the first locating element to the second locating element.

5. The clamp according to claim 4, wherein the first locating element and the second locating element are a first locating hole and a second locating hole respectively.

6. The clamp according to claim 1, wherein a plurality of hooks protrude from edges of each fixing portion remote from the first surface.

7. The clamp according to claim 6, wherein each hook comprises a first section extending substantially perpendicular to and away from the first surface, and a second section connected with the first section and extending in a direction from the first end to the second end, each second section being spaced apart from a corresponding edge of the fixing portion by a distance.

8. The clamp according to claim 7, wherein each fixing portion includes a locating tab at a lower end thereof.

9. A contact rail assembly for a photovoltaic assembly, the contact rail assembly comprising:
   a contact rail having a contact tip and a body, the contact tip having a contact surface extending from and substantially perpendicular to the body, and the contact tip adapted to be electrically connected with a bus bar; and,
   a clamp, detachably fixed to the contact tip by fixing portions, and having a first surface facing the contact surface, a locating protrusion being engageable with a first locating element such that a parallel extension of an extension portion is spaced apart from the contact surface by a distance, and the locating protrusion being engageable with a second locating element such that the parallel extension abuts the contact surface or an end of the bus bar to be clamped between the contact surface and the parallel extension.

10. The contact rail assembly according to claim 9, wherein edges of each fixing portion remote from the first surface are bent to form guiding recesses extending in a direction substantially in parallel with the first surface and adapted to be slidably fit to the contact tip.

11. The contact rail assembly according to claim 9, further comprising a plurality of hooks are protruding from the edges of each fixing portion.

12. The contact rail assembly according to claim 11, further comprising a plurality of bayonets on the contact rail whereby the plurality of hooks are adapted to be engaged within the plurality of bayonets respectively.

13. The contact rail assembly according to claim 12, wherein each hook comprises a first section extending substantially perpendicular to and away from the first surface, and a second section connected with the first section and extending in a direction from a first end to a second end, wherein each second section is spaced apart from a corresponding edge of the fixing portion by a distance substantially equaling to a thickness of the contact tip.

14. The contact rail assembly according to claim 12, wherein each fixing portion includes a locating tab at a lower end thereof.

15. The contact rail assembly according to claim 14, wherein a portion of an end of the contact rail includes a recess, adapted to receive the locating protrusion.

16. A photovoltaic assembly junction box, comprising:
   a housing;
   at least one bus bar; and,
   a contact rail assembly including a contact rail having a contact tip and a body, the contact tip having a contact surface extending from and substantially perpendicular to the body, and the contact tip adapted to be electrically connected with a bus bar; and, a clamp, detachably fixed to the contact tip by fixing portions, and having a first surface facing the contact surface, a locating protrusion being engageable with a first locating element such that a parallel extension of an extension portion is spaced apart from the contact surface by a distance, and the locating protrusion being engageable with a second locating element such that the parallel extension abuts the contact surface or an end of the bus bar to be clamped between the contact surface and the parallel extension;

wherein in the housing, the bus bar is adapted to be electrically connected with the contact tip of a corresponding contact rail by means of the clamp.

* * * * *